United States Patent Office 3,376,321
Patented Apr. 2, 1968

3,376,321
3,17-DISUBSTITUTED 5,6-DICHLORO ANDROSTANES
John Wayne Cole, Deerfield, Ill., assignor to Abbott Laboratories, North Chicago, Ill., a corporation of Illinois
No Drawing. Filed Aug. 3, 1965, Ser. No. 477,022
8 Claims. (Cl. 260—397.1)

ABSTRACT OF THE DISCLOSURE 3,17-disubstituted 5,6-dichloroandrostanes with androgenic/anabolic activity.

The present invention is directed to new chlorinated steroids; more particularly, it is directed to 3,17-disubstituted 5,6-dichloroandrostanes. These new compounds have valuable properties as mild androgenic and anabolic substances in warm-blooded animals and are useful for improving the ratio of animal growth to parasite growth. Thus they are also useful as agents for the treatment of parasitic infections in warm blooded animals.

The compounds of the present invention have the following structural formula

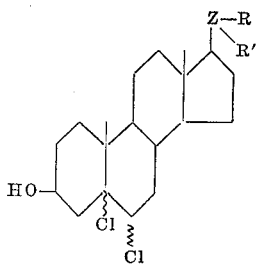

wherein Z is the trivalent amide group

and R and R' are each selected from hydrogen and lower-alkyl, and the corresponding 3β-acetates. Thus, the 17-substituent may be an acylamido group, or it may be a carbamoyl group which may be substituted by one or two alkyl groups. In all instances, the fatty acid chains or alkyl groups are limited to 1–7 carbon atoms.

The new substances are made by adding essentially one molar equivalent of chlorine, under mild buffered conditions, to the corresponding Δ⁵-unsaturated steroid, followed by washing to remove the buffer, and drying. The crude dichlorides may be used as such but the stability of the product is improved by crystallization from an organic solvent such as methanol or acetone. The chlorination process, which is in part the subject of the present application, obviously may lead to 4 stereoisomers namely, the 5α–6α, the 5α–6β, the 5β–6α, and the 5β–6β-dichlorosteroids. In each instance investigated, it has been found that the 5α,6β-isomer is obtained as the major component, and is the one purified by recrystallization. However, the mixture of isomers may be used for the purpose indicated above.

The Δ⁵-unsaturated steroid amides which are used as starting material are obtainable by known methods. The procedure of coupling 3β-acetoxy-5-androstene-17β-carboxylic acid chloride with an amine, e.g. by the method of German Patent No. 1,100,625, Example 2, is generally useful for making the amides having a carbon atom attached to the 17-position; while the reaction of a fatty acid, acid chloride or anhydride, with the Δ⁵-unsaturated 17-aminosteroid is useful for obtaining the amides having nitrogen attached to the 17-position. Certain of the amide starting materials can be made conveniently by the Beckmann method as described in Chemical Abstracts, 48, 13738.

The hydroxy-dichloro-amides of this invention may be purified, or prepared and purified in the form of their 3-lower fatty acid esters, e.g. the 3β-acetate, followed by mild hydrolysis with aqueous alkali carbonate to liberate the hydroxy-dichloro-amides. Strong alkali solutions damage or destroy the products and should not be used. Sodium or potassium carbonate or bicarbonate solutions have provided satisfactory hydrolysis conditions. Thus the 3β-acetoxy-dichloro-amides are useful intermediates in the preparation of the 3β-hydroxy-dichloro-amides, which have the above pharmaceutical utility.

To better illustrate the preparation of the new compounds, reference is made to the following examples which are illustrations only and do not constitute the only embodiments of preparation.

Example I.—3β-hydroxy-5,6-dichloroandrostane-17β-(N-cyclopropyl)carboxamide

A mixture of 5.6 g. of 3β-acetoxy-5-androstene-17β-carboxylic acid, 100 ml. of anhydrous ether, 10 ml. of benzene, 8 ml. of thionyl chloride and one drop of pyridine is stirred slowly at room temperature for four hours, and then evaporated under reduced pressure at about 30° C. The crude acid chloride is purified by adding 10 ml. of benzene followed by distillation under reduced pressure at 30° C. to remove the benzene and volatile impurities. This treatment with 10 ml. of benzene is repeated. The acid chloride is then dissolved in 140 ml. of anhydrous ether, the solution is cooled to 10° C., and 4.5 ml. of liquid cyclopropylamine is added with stirring. After one hour the mixture is washed successively with small portions of water, dilute hydrochloric acid, water, dilute sodium hydroxide solution and water. The ether solution is then concentrated by distillation to crystallize the white 3β-acetoxy-5-androstene-17β-(N-cyclopropyl)carboxamide. The crude product melts at about 140° C., and a sample recrystallized from benzene shows a melting point 153–154° C. The analysis and infrared spectrum are in agreement with the expected product of empirical formula $C_{25}H_{37}NO_3$.

A mixture of 5 g. of the above crystalline amide, 80 ml. of methanol, 20 ml. of water and 2 g. of sodium carbonate is stirred and refluxed for 90 minutes. At this time, 15 ml. of additional water is added, and the heating and stirring are continued for another 90 minutes. During slow cooling the product crystallizes. It is separated by filtration and washed first with 60% aqueous methanol and then several times with water. The dried, white needles have a melting point of 243–244° C., and analyze for $C_{23}H_{35}NO_2$; the infrared spectrum is consistent with that expected for 3β-hydroxy-5-androstene-17β-(N-cyclopropyl)carboxamide.

A solution of 1.07 g. of 3β-hydroxy-5-androstene-17β-(N-cyclopropyl)carboxamide in 70 ml. of methylene chloride and 0.5 ml. of pyridine is clarified by warming, and then cooled in an ice-salt bath to −5° C. The solution is stirred at this temperature while chlorine is added dropwise as a solution in carbon tetrachloride (3 grams of chlorine per 100 ml. of solution) until 7 ml. plus a few drops are added. The solution is then washed in sequence with water, dilute hydrochloric acid, water, dilute aqueous sodium hydroxide, and water. The methylene chloride solution is evaporated under reduced pressure, producing a crystalline residue, which is then recrystallized from acetone. The crystals are washed with anhydrous ether and dried to obtain 3β-hydroxy-5,6-dichloroandrostane - 17β - (N-cyclopropyl)carboxamide, melting point 204–206° C. (decomposition). This product analyzes correctly for $C_{23}H_{35}Cl_2NO_2$ and has an infrared spectrum consistent with the assigned structure.

Example 2.—3β-substituted-5,6-dichloroandrostane-17β-carboxylic acids

A solution is prepared by dissolving 3.36 grams of 3β-acetoxy-5-androstene-17β-carboxylic acid in 50 ml. of methylene chloride containing 0.5 ml. of pyridine. This solution is stirred at 0° C. and treated by the steady, dropwise addition of a room-temperature solution of 0.7 gram of chlorine in 14 ml. of carbon tetrachloride. Two minutes after this addition is complete, the reaction mixture is washed once with dilute hydrochloric acid and three times with water. The heavy organic layer is concentrated in vacuum to a residue of white, crystalline, waxy 3β - acetoxy-5,6-dichloroandrostane-17β-carboxylic acid.

The crude material is converted to the corresponding 3β-hydroxy compound by stirring a mixture of 3.5 g. of the above material, 3.5 g. of potassium bicarbonate, 75 ml. of methanol and 15 ml. of water under reflux for 4 hours. Most of the methanol is then removed by distillation at slightly reduced pressure, and the concentrated solution is acidified with acetic acid. The resulting turbid solution is poured into 150 ml. of ice-water which precipitates the white 3β-hydroxy-5,6-dichloroandrostane-17β-carboxylic acid. The latter can be recovered by filtration or by extraction with methylene chloride followed by concentration of the extract. The new hydroxy acid is recrystallized twice from acetone to give 3β - hydroxy - 5,6 - dichloroandrostane-17β-carboxylic acid melting at 178–179° C. with decomposition. The elemental analysis is in close agreement with that calculated from the empirical formula $C_{20}H_{30}O_3Cl_2$.

For reconversion to the acetate, the dry material is dissolved in 6 ml. of pyridine and 4 ml. of acetic anhydride. This solution is allowed to stand at room temperature for 18 hours, and water is then added dropwise while stirring. When about 30 drops of water have been added, the water addition is interrupted for about 15 minutes to insure complete hydrolysis of any excess acetic anhydride which may be present and then water addition is resumed. After about 10 ml. of water is added, a crystalline precipitate is obtained. The precipitate is filtered off, washed with water and dried, to obtain 3β-acetoxy - 5,6 - dichloroandrostane-17β-carboxylic acid. After recrystallization of this material from acetone, 3β-acetoxy-5α,6β-dichloroandrostane-17β-carboxylic acid is obtained as prisms melting at 214–215° C. (decomposition). The elemental analysis is in close agreement with that calculated for the empirical formula $C_{22}H_{32}Cl_2O_4$ and the compound shows the expected infrared absorption pattern.

Example 3.—3β-acetoxy-5,6-dichloroandrostane-17β-(N-cyclopropyl)carboxamide (a) In a dry, round flask, 1.0 g. of 3β-acetoxy-5,6-dichloroandrostane-17β-carboxylic acid is covered with 30 ml. of anhydrous ether, 0.5 ml. of thionyl chloride and 1 drop of pyridine. This mixture is covered with nitrogen, swirled, and allowed to stand for 2 hours. After the first hour, the original crystals are dissolved. The solution is subsequently concentrated at 20° C. under reduced pressure and the new residue is further evaporated by a stream of dry nitrogen. The obtained acid chloride is then suspended in 40 ml. of fresh, anhydrous ether, stirred, and treated by adding dropwise 1.0 ml. of cyclopropylamine. After 15 minutes from the last addition, the solvent is evaporated with the aid of a stream of dry nitrogen and the residue is stirred with 15 ml. of 5% acetic acid to complete crystallization. The crystalline product is collected on a filter funnel and washed with water. The crude dichloroamide, after drying, weighs about 1.0 g. and shows a melting point of about 185° C. (decomposition). After recrystallization from acetone, the compound is obtained as a white crystalline material which, upon heating loosens solvent at about 100° C. and then shows a melting point of 198–200° C. The dried 3β - acetoxy - 5,6 - dichloroandrostane-17β-(N-cyclopropyl)carboxamide shows an elemental analysis which is in close agreement with that calculated for the compound of empirical formula $C_{25}H_{37}Cl_2NO_3$ and it has the expected infrared absorption pattern.

Example 4.—3β-hydroxy-5,6-dichloroandrostane-17β-(N-cyclopropyl)carboxamide

A mixture of 1.06 g. of potassium bicarbonate, 3 ml. of water, 30 ml. of methanol, and 1.0 g. of 3β-acetoxy-5,6-dichloroandrostane-17β - (N - cyclopropyl)carboxamide is stirred at the reflux temperature for 3 hrs. The mixture is concentrated to about one third of the volume, neutralized with acetic acid, diluted with water and extracted with methylene chloride. The extract is washed with water, concentrated to a small volume in vacuo, and the residue is crystallized from ether containing a small amount of petroleum ether. The crude, crystalline product is recrystallized from acetone to give white needles of 3β-hydroxy-5,6-dichloroandrostane-17β - (N - cyclopropyl)carboxamide, melting at 205–7° C. (decomposition). The elemental analysis of this material is in close agreement with the values calculated for the compound of empirical formula $C_{23}H_{35}Cl_2NO_2$, and the infrared absorption spectrum is consistent with the expected structure.

Example 5.—3β-substituted-5,6-dichloroandrostane-17β-(N-methyl)carboxamides

One gram of 3β-acetoxy-5,6-dichloroandrostane-17β-carboxylic acid is processed as in Example 3 except that 0.6 g. of methylamine gas is bubbled into the reaction mixture instead of the cyclopropylamine. The 3β-acetoxy-5,6-dichloroandrostane-17β - (N - ethyl)carboxamide so formed crystallizes directly from the reaction mixture. The crystals are washed with water and ether and dried. They show analytical values which are in close agreement with those calculated for the formula $C_{23}H_{35}Cl_2NO_3$.

By following the procedure of Example 4, the 3β-acetoxy compound is hydrolyzed to 3β-hydroxy-5,6-dichloroandrostane-17β-(N-methyl)carboxamide.

Example 6.—3β-substituted-5,6-dichloroandrostane-17β-carboxamides

A solution of 1.0 g. of 3β-acetoxy-5,6-dichloroandrostane-17β-carbonyl chloride prepared as described in Example 3 is suspended in 40 ml. of fresh, anhydrous ether and treated at 5° C. with a stream of ammonia gas for 2 minutes. The resulting white suspension is stirred, evaporated to about half its volume under a nitrogen stream, and then mixed with 10 ml. of water. The crystalline material is collected on a filter, washed three times with water and once with ether, and dried. The crude 3β-acetoxy-5,6-dichloroandrostane-17β-carboxamide may be recrystallized from acetone to obtain an analytical sample, which shows values in close agreement with those calculated for the formula $C_{22}H_{33}Cl_2NO_3$. By following the procedure of Example 4, the above 3β-acetoxy compound is hydrolyzed to 3β-hydroxy-5,6-dichloroandrostane-17β-carboxamide of formula $C_{20}H_{31}Cl_2NO_2$.

Example 7.—3β-substituted-5,6-dichloroandrostane-17β-(N,N-diethyl)carboxamides

A mixture of 2.0 g. of 3β-acetoxy-5,6-dichloroandrostane-17β-carboxylic acid, 70 ml. of anhydrous ether, 1.0 ml. of thionyl chloride and one drop of pyridine is stirred at room temperature for one hour. The solvent is distilled off at slightly reduced pressure and the residue is dried under a stream of nitrogen. This crude acyl chloride is stirred at 10° C. with 40 ml. of anhydrous ether and 2.0 ml. of diethylamine is added. After 30 minutes the mixture is concentrated to about half its volume and 20 ml. of 5% acetic acid is added. The crystalline suspension is filtered and the filter cake is washed three times with water. The crude 2.1 g. of 3β-acetoxy-5,6-dichloroandrostane-17β-(N,N-diethyl)carboxamide melts at 135–150° C. The material may be recrystallized from acetone. It is identified by its infrared absorption spectrum and by hydrolysis to the corresponding 3β-hydroxy derivative.

By the procedure of Example 4, this 3β-acetoxy compound is hydrolyzed to 3β-hydroxy-5,6-dichloroandrostane-17β-(N,N-diethyl)carboxamide which is identified by its infrared absorption spectrum. This product shows double-melting-point behavior with a transition point at about 140° C. and a second melting point at about 190° with decomposition. A recrystallized sample is obtained in white needles and shows a melting point transition at 140° C. and a clear melt at 191–3° C.; it analyzes for the compound of formula $C_{24}H_{39}Cl_2NO_2$, and its infrared spectrum is in agreement with the expected structure.

Example 8.—3β-acetoxy-17β-acetamido-5,6-dichloroandrostane

A solution of 2.73 g. of 3β-acetoxy-17β-acetamido-5-androstene in 75 ml. of methylene chloride and 0.3 ml. of pyridine is cooled to about 0° C. and stirred, while a solution containing 5% chlorine in carbon tetrachloride is added dropwise until 0.55 g. of chlorine is transferred. The end point is indicated by a slight color change. Two minutes after reaching the end point, the solution is mixed under stirring with a cooled solution of 0.6 ml. of concentrated hydrochloric acid and 0.1 g. of sodium sulfite in 50 ml. of water. From the formed two-phase system the methylene chloride layer is separated, washed three times with water, and concentrated in vacuo. The crystalline residue is triturated with ether and the crystals are separated and identified as crude 3β-acetoxy-17β-acetamido-5,6-dichloroandrostane melting at 139–150° C. (decomposition) and showing analytical values in close agreement with those calculated for the compound of empirical formula $C_{23}H_{35}Cl_2NO_3$.

Example 9.—3β-hydroxy-17β-acetamido-5,6-dichloroandrostane

A mixture of 3.0 g. of 3β-acetoxy-17β-acetamido-5,6-dichloroandrostane, 4.25 g. of potassium bicarbonate and 100 ml. of methanol is stirred and warmed in a hot-water bath at the methanol reflux point for three hours. The solution is cooled, 10 ml. of acetic acid is added and then the solvent is distilled under reduced pressure until the solution is concentrated to about one fourth volume. Water is slowly added to cause the product to crystallize; about 150 ml. of water is needed to complete the crystallization. The product is filtered, washed with water and dried. When a sample of this product is heated, it shows a transition temperature of about 100° C. and then decomposition at about 186–190° C. After recrystallization from acetone, the 3β-hydroxy-17β-acetamido-5,6-dichloroandrostane is obtained in white prisms melting at 196–7° C. (decomposition) and having analytical values which are in close agreement with those calculated for the compound of empirical formula $C_{21}H_{33}Cl_2NO_2$. The NMR-spectrum confirms the assigned structure and indicates the 5α,6β-dichloro-compound to be the prevailing isomer.

Example 10

3β-substituted-17β-(N-methylformamido)-5,6-dichloroandrostanes

When the process of Example 8 is carried out as described but using 2.73 grams of 3β-acetoxy-17β-(N-methylformamido)-5-androstene as the starting material, 3β-acetoxy-17β-(N - methylformamido) - 5,6 - dichloroandrostane is obtained which has analytical values corresponding with those calculated for the compound of empirical formula $C_{23}H_{35}Cl_2NO_3$. This substance is hydrolyzed by following the procedure of Example 9 to obtain 3β-hydroxy-17β-(N - methylformamido) - 5,6 - dichloroandrostane having analytical values in agreement with those calculated for the compound of empirical formula $C_{21}H_{33}Cl_2NO_2$.

As seen from the above examples, the products of the present invention can be made by alternate routes, namely, by converting the 17-substituent of a 5-androstene first into the desired group and chlorinating the resulting intermediate to the corresponding 5,6-dichloro products; or alternately, the 5-androstene may be chlorinated first and the 17-substituent is subsequently changed to the desired configuration. The chlorination can be carried out under various conditions, using as a reaction medium an inert halogenated, organic solvent such as chloroform, methylene chloride, carbon tetrachloride, ethylene dichloride and the like. The term "inert" is used herein to express that the solvent does not react with the starting material or the expected end product. The preferred temperature for the halogenation is between —30 and +10° C. but temperatures up to 25° C. can be used successfully except that somewhat lower yields are then obtained. In order to chlorinate the Δ⁵-double bond without inducing other possible molecular modificatons, the amount of chlorine should be measured carefully so that 1.0–1.05 moles of chlorine are used per mole of starting material. The chlorine can be added as a solution in an inert organic solvent which is preferably one that is miscible with the solvent used for the steroidal starting material, or the chlorine can be introduced as a gas. In either case, the chlorination takes place almost instantaneously but care should be taken that the reaction mixture does not warm up above the desired chlorination temperature. For best results, it should be observed that a fairly concentrated solution of the Δ⁵-steroidal starting material is used for the chlorination process. Also, it is often advantageous to incorporate an acid binding agent into the chlorination mixture, e.g. pyridine.

Others may practice the invention in any of the numerout ways which will be suggested to one skilled in the art by the present disclosure. All such practice of the invention is considered a part hereof provided it falls within the scope of the appended claims.

I claim:
1. Steroids of the formula

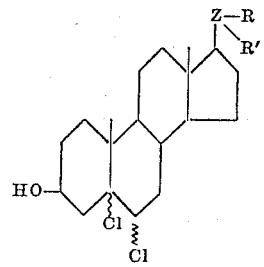

and their corresponding 3β-acetates wherein Z is a trivalent radical of the formula

and wherein R and R′ each are selected from the group consisting of hydrogen and lower alkyl.

2. Steroids of claim 1 wherein the chlorine atoms are located in the 5α-position and the 6β-position.

3. 3β-hydroxy - 5,6 - dichloroandrostane-17β-(N-cyclopropyl)carboxamide.

4. 3β - hydroxy - 5,6 - dichloroandrostane - 17β - (N-methyl)carboxamide.

5. 3β - hydroxy - 5,6 - dichloroandrostane - 17β - carboxamide.

6. 3β-hydroxy - 5,6 - dichloroandrostane - 17β - (N,N-diethyl)carboxamide.

7. 3β - hydroxy - 17β - acetamido - 5,6 - dichloroandrostane.

8. 3β - hydroxy - 17β - (N - methylformamido)-5,6-dichloroandrostane.

References Cited
UNITED STATES PATENTS

| 2,520,276 | 8/1950 | Farinacci | 260—397.1 |
| 2,884,417 | 4/1959 | Cutler et al. | 260—239.55 |

ELBERT L. ROBERTS, *Primary Examiner.*